(12) United States Patent
Inoue et al.

(10) Patent No.: US 11,274,727 B2
(45) Date of Patent: Mar. 15, 2022

(54) MOUNT BUSH

(71) Applicants: HONDA MOTOR CO., LTD., Tokyo (JP); NATIONAL UNIVERSITY CORPORATION KANAZAWA UNIVERSITY, Kanazawa (JP)

(72) Inventors: Toshio Inoue, Wako (JP); Toshihiko Komatsuzaki, Kanazawa (JP)

(73) Assignees: HONDA MOTOR CO., LTD., Tokyo (JP); NATIONAL UNIVERSITY CORP KANAZAWA UNIVERSITY, Kanazawa (JP)

( * ) Notice: Subject to any disclaimer, the term of this patent is extended or adjusted under 35 U.S.C. 154(b) by 159 days.

(21) Appl. No.: 16/583,298

(22) Filed: Sep. 26, 2019

(65) Prior Publication Data

US 2020/0109761 A1 Apr. 9, 2020

(30) Foreign Application Priority Data

Oct. 5, 2018 (JP) .............................. JP2018-190232

(51) Int. Cl.
*F16F 13/30* (2006.01)
*F16F 13/26* (2006.01)
(Continued)

(52) U.S. Cl.
CPC .......... *F16F 13/262* (2013.01); *B60K 5/1208* (2013.01); *B60K 5/1283* (2013.01);
(Continued)

(58) Field of Classification Search
CPC ...... F16F 13/262; F16F 13/1463; F16F 13/28; F16F 13/305; F16F 13/14; F16F 2228/066; B60K 5/1208; B60K 5/1283
(Continued)

(56) References Cited

U.S. PATENT DOCUMENTS 5,492,312 A    2/1996 Carlson
5,632,361 A *  5/1997 Wulff .................... F16F 9/3405
                                                  188/267
(Continued)

FOREIGN PATENT DOCUMENTS

CN    104963982    10/2015
DE   102004024226   12/2005
(Continued)

OTHER PUBLICATIONS

Japanese Notice of Allowance for Japanese Patent Application No. 2018-190232 dated Sep. 23, 2020.
(Continued)

*Primary Examiner* — Thomas W Irvin
(74) *Attorney, Agent, or Firm* — Amin, Turocy & Watson, LLP

(57) ABSTRACT

A mount bush includes a tube member, a shaft member disposed coaxially with an axis of the tube member and having a coil, a first liquid chamber disposed at an upper side in an internal space between the tube member and the shaft member, a second liquid chamber in communication with a lower side of the first liquid chamber and containing a magnetic viscoelastic fluid, and a third liquid chamber in communication with a lower side of the second liquid chamber and having a porous body, wherein the coil is disposed such that a magnetic path that passes through the second liquid chamber in an orientation along at least one of an axial direction and a radial direction is formed through electrical conduction.

7 Claims, 6 Drawing Sheets

(51) Int. Cl.
*H01F 1/44* (2006.01)
*B60K 5/12* (2006.01)
*F16F 13/28* (2006.01)
*F16F 13/14* (2006.01)

(52) U.S. Cl.
CPC .......... *F16F 13/1463* (2013.01); *F16F 13/28* (2013.01); *H01F 1/447* (2013.01); *F16F 2228/066* (2013.01)

(58) Field of Classification Search
USPC ........................ 267/140.14, 140.15
See application file for complete search history.

(56) References Cited

U.S. PATENT DOCUMENTS

| | | | | |
|---|---|---|---|---|
| 6,427,813 | B1* | 8/2002 | Carlson | F16F 9/535 188/267.2 |
| 8,091,692 | B2* | 1/2012 | Deshmukh | F16F 9/003 188/267.2 |
| 8,651,250 | B2* | 2/2014 | Nehl | F16F 9/535 188/267 |
| 9,390,875 | B2* | 7/2016 | Kohlhafer | H01H 50/04 |
| 10,767,722 | B2* | 9/2020 | Inoue | B62D 27/04 |
| 10,823,251 | B2* | 11/2020 | McCullough | F16F 9/19 |
| 2002/0036372 | A1* | 3/2002 | Goto | F16F 13/268 267/140.14 |
| 2004/0182661 | A1 | 9/2004 | Lun | |
| 2009/0205913 | A1 | 8/2009 | Hart | |
| 2010/0089711 | A1* | 4/2010 | Nehl | F16F 9/535 188/267.2 |
| 2014/0354381 | A1* | 12/2014 | Kohlhafer | H01F 7/081 335/179 |
| 2018/0363724 | A1* | 12/2018 | Mccullough | F16F 9/3292 |
| 2020/0109762 | A1* | 4/2020 | Inoue | H01F 7/06 |

FOREIGN PATENT DOCUMENTS

| | | |
|---|---|---|
| JP | 63-210432 | 9/1988 |
| JP | 2003-035345 | 2/2003 |
| JP | 2003-065384 | 3/2003 |
| JP | 2004-003651 | 1/2004 |
| JP | 2012-117668 | 6/2012 |
| JP | 2012-157574 | 8/2012 |
| JP | 2015-183846 | 10/2015 |
| WO | 2019/026566 | 2/2019 |

OTHER PUBLICATIONS

Chinese Office Action for Chinese Patent Application No. 201910897774.1 dated Dec. 17, 2020.

* cited by examiner

MOUNT BUSH

CROSS-REFERENCE TO RELATED APPLICATION

Priority is claimed on Japanese Patent Application No. 2018-190232, filed Oct. 5, 2018, the content of which is incorporated herein by reference.

BACKGROUND OF THE INVENTION

Field of the Invention

The present invention relates to a mount bush.

Description of Related Art

In the related art, a damping apparatus (a mount bush) using a magnetic viscoelastic fluid is known as a damper of an engine mount or a suspension of an automobile.

For example, Japanese Unexamined Patent Application, First Publication No. 2003-35345 discloses an automatic tensioner including a cylinder body connected to an engine, a piston fitted into the cylinder body and connected to an arm, a communication path configured to divide two chambers filled with a magnetic viscoelastic fluid by the piston in the cylinder body and allow the two chambers to communicate with each other, and an electromagnet configured to generate a magnetic force on an outer side of the cylinder body. According to the technology disclosed in Japanese Unexamined Patent Application, First Publication No. 2003-35345, when a magnetic force on the magnetic viscoelastic fluid is controlled by being changed, a damping constant with respect to a moving body can be varied, and a damping means of the automatic tensioner can be made active.

SUMMARY OF THE INVENTION

However, in the technology disclosed in Japanese Unexamined Patent Application, First Publication No. 2003-35345, when a stroke is small like in a mount bush of an engine and it is difficult to stir a magnetic viscoelastic fluid, a magnetic powder contained in the magnetic viscoelastic fluid may precipitate, and the performance of a damping apparatus may deteriorate.

An aspect of the present invention is directed to providing a high performance mount bush in which precipitation of a magnetic powder contained in a magnetic viscoelastic fluid is suppressed.

(1) A mount bush according to an aspect of the present invention includes a tube member; a shaft member disposed inside the tube member coaxially with an axis of the tube member and having a coil; a first liquid chamber disposed at an upper side in an internal space between the tube member and the shaft member in the gravity upward/downward direction; a second liquid chamber in communication with a lower side of the first liquid chamber in the gravity upward/downward direction and containing a magnetic viscoelastic fluid; and a third liquid chamber in communication with a lower side of the second liquid chamber in the gravity upward/downward direction and having a porous body, wherein the coil is disposed such that a magnetic path that passes through the second liquid chamber in an orientation along at least one of an axial direction along the axis and a radial direction perpendicular to the axial direction is formed through electrical conduction.

(2) In the aspect of the above-mentioned (1), the first liquid chamber may have the porous body.

(3) In the aspect of the above-mentioned (1) or (2), the second liquid chamber may include an axial passage that communicates with the first liquid chamber and that extends in the axial direction; and a shaft-perpendicular passage that communicates with the axial passage and the third liquid chamber and that extends in the radial direction, wherein the coil is disposed such that a magnetic path, which passes through the axial passage in an orientation along the radial direction and passes through the shaft-perpendicular passage in an orientation along the axial direction, is formed through the electrical conduction.

(4) In the aspect of the above-mentioned (1) or (2), at least one of the first liquid chamber and the second liquid chamber may have a first magnetic member fixed to the tube member, at least one of the second liquid chamber and the third liquid chamber may have a second magnetic member fixed to the shaft member, and the first magnetic member and the second magnetic member may at least partially overlap in the radial direction.

(5) In the aspect of the above-mentioned (3), at least one of the first liquid chamber and the second liquid chamber may have a first magnetic member fixed to the tube member, at least one of the second liquid chamber and the third liquid chamber may have a second magnetic member fixed to the shaft member, and the first magnetic member and the second magnetic member may at least partially overlap in the axial direction.

(6) In the aspect of the above-mentioned (5), an upper end surface in the gravity upward/downward direction of the porous body provided in the third liquid chamber and an upper end surface in the gravity upward/downward direction of the second magnetic member may be set to have the same height.

(7) In the aspect of the above-mentioned (5), a height of an upper end surface in the gravity upward/downward direction of the porous body provided in the third liquid chamber may be set to be above an upper end surface in the gravity upward/downward direction of the second magnetic member and to be level with or lower than a lower end surface in the gravity upward/downward direction of the first magnetic member.

(8) In the aspect of any one of the above-mentioned (1) to (7), an orifice member may be disposed in at least one of a space between the first liquid chamber and the second liquid chamber and a space between the second liquid chamber and the third liquid chamber.

According to the aspect of the above-mentioned (1), since the magnetic viscoelastic fluid passes through the second liquid chamber and moves between the first liquid chamber and the third liquid chamber, damping characteristics of the mount bush can be controlled by varying a viscosity of the magnetic viscoelastic fluid in the second liquid chamber. Here, when a stroke is small like in a mount bush of an engine and it is difficult to stir the magnetic viscoelastic fluid, the magnetic powder contained in the magnetic viscoelastic fluid is precipitated, and the performance of a damping apparatus may deteriorate. For this reason, in the related art, contrivances such as increasing the density of the entire magnetic viscoelastic fluid and increasing the viscosity of the base liquid by increasing an amount of the magnetic powder have been performed to minimize precipitation. However, even when a viscosity of the base liquid is increased, hardly any difference in viscosity occurs between electrical conduction and non-conduction to the coil because an original viscosity is high, and a rate of change of the viscosity may be low. In addition, when an amount of the magnetic powder is increased, since a larger amount of magnetic powder than in a conventional case is required, costs may be increased.

According to the mount bush of the configuration, since the third liquid chamber has the porous body, movement of the magnetic powder of the magnetic viscoelastic fluid present in the second liquid chamber above the third liquid chamber in the gravity upward/downward direction into the third liquid chamber due to gravity is suppressed. Accordingly, precipitation of the magnetic powder is suppressed, and a state in which a density of the magnetic powder in the second liquid chamber is high can be maintained. In addition, since there is no need to mix in a large amount of magnetic powder to maintain the state in which the density of the magnetic powder in the second liquid chamber is high, magnetic powder can be saved. In addition, since a volume of the internal space of the mount bush filled with the fluid (the base liquid) of the magnetic viscoelastic fluid is reduced due to the porous body, base liquid can be saved. Accordingly, magnetic powder and base liquid can be saved, and manufacturing costs can be reduced.

In addition, the coil forms a magnetic path in the second liquid chamber through electrical conduction. Since the magnetic viscoelastic fluid maintained in the state in which the density of the magnetic powder is high due to the porous body is present in the second liquid chamber, the viscosity of the magnetic viscoelastic fluid in the second liquid chamber can be rapidly varied through the electrical conduction to the coil.

Accordingly, it is possible to provide a high performance mount bush in which precipitation of the magnetic powder contained in the magnetic viscoelastic fluid is suppressed.

According to the aspect of the above-mentioned (2), since the first liquid chamber disposed above the second liquid chamber in the gravity upward/downward direction and the third liquid chamber disposed below the second liquid chamber in the gravity upward/downward direction have the porous bodies, respectively, movement of the magnetic powder into the first liquid chamber and the third liquid chamber can be suppressed. Accordingly, the state in which the density of the magnetic powder in the second liquid chamber is high can be better maintained.

Accordingly, it is possible to provide a high performance mount bush in which precipitation of the magnetic powder contained in the magnetic viscoelastic fluid is suppressed.

According to the aspect of the above-mentioned (3), since the third liquid chamber has the porous body, movement of the magnetic powder of the magnetic viscoelastic fluid present in the second liquid chamber into the third liquid chamber due to the gravity can be suppressed. Accordingly, precipitation of the magnetic powder is suppressed, and the state in which the density of the magnetic powder in the axial passage and the shaft-perpendicular passage of the second liquid chamber is high can be maintained.

In addition, the coil forms magnetic paths in two directions of an orientation in which the axial passage is in the radial direction and an orientation in which the shaft-perpendicular passage is in the axial direction according to electrical conduction. Since the magnetic viscoelastic fluid maintained in the state in which the density of the magnetic powder is high due to the porous body is present in the axial passage and the shaft-perpendicular passage, the viscosity of the magnetic viscoelastic fluid in the axial passage and the shaft-perpendicular passage can be rapidly varied through electrical conduction to the coil. In addition, since the magnetic paths are formed in two directions, a rate of change of the viscosity can be increased.

Accordingly, it is possible to provide a high performance mount bush in which precipitation of the magnetic powder contained in the magnetic viscoelastic fluid is suppressed.

According to the aspect of the above-mentioned (4), the first magnetic member provided in at least one of the first liquid chamber and the second liquid chamber and the second magnetic member provided in at least one of the second liquid chamber and the third liquid chamber at least partially overlap in the radial direction. Accordingly, in the portion in which the first magnetic member and the second magnetic member overlap in the radial direction, the axial passage extending in the axial direction can be formed between the first magnetic member and the second magnetic member. In addition, a flow path width of the axial passage can be varied and a predetermined viscosity can be set by changing dimensions of the first magnetic member and the second magnetic member.

In addition, since the third liquid chamber disposed below the axial passage has the porous body, precipitation of the magnetic powder is suppressed, and the state in which the density of the magnetic powder in the axial passage is high can be maintained.

Accordingly, it is possible to provide a high performance mount bush in which precipitation of the magnetic powder contained in the magnetic viscoelastic fluid is suppressed.

According to the aspect of the above-mentioned (5), the first magnetic member provided in at least one of the first liquid chamber and the second liquid chamber and the second magnetic member provided in at least one of the second liquid chamber and the third liquid chamber at least partially overlap in the axial direction. Accordingly, in the portion in which the first magnetic member and the second magnetic member overlap in the axial direction, the shaft-perpendicular passage extending in the radial direction is formed between the first magnetic member and the second magnetic member. In addition, in the portion in which the first magnetic member and the shaft member overlap in the radial direction, the axial passage extending in the axial direction is formed between the first magnetic member and the shaft member. In this way, the shaft-perpendicular passage and the axial passage extending in different directions can be formed by the first magnetic member and the second magnetic member, respectively. Accordingly, a rate of change of the viscosity can be improved, and damping characteristics can be improved.

In addition, since the third liquid chamber disposed below the shaft-perpendicular passage has the porous body, precipitation of the magnetic powder is suppressed, and the state in which the density of the magnetic powder in the shaft-perpendicular passage and the axial passage is high can be maintained.

Accordingly, it is possible to provide a high performance mount bush in which precipitation of the magnetic powder contained in the magnetic viscoelastic fluid is suppressed.

According to the aspect of the above-mentioned (6), since the upper end surface of the porous body provided in the third liquid chamber and the upper end surface of the second magnetic member are set to have the same height, the magnetic powder can freely move in the radial direction from the upper end surface of the porous body to the shaft-perpendicular passage. Accordingly, precipitation of the magnetic powder is suppressed, and the state in which the density of the magnetic powder in the shaft-perpendicular passage (the second liquid chamber) is high can be maintained.

In addition, upon electrical conduction to the coil, the magnetic powder on the upper surface of the porous body can be efficiently moved into the shaft-perpendicular passage. Accordingly, a viscosity of the mount bush can be reliably controlled according to electrical conduction to the coil.

According to the aspect of the above-mentioned (7), since the height of the upper end surface of the porous body provided in the third liquid chamber is set to be above the upper end surface of the second magnetic member or to be level with or lower than the lower end surface of the first magnetic member, the magnetic powder can be moved in the radial direction from the upper end surface of the porous body toward the shaft-perpendicular passage. Accordingly, precipitation of the magnetic powder is suppressed, and the state in which the density of the magnetic powder in the shaft-perpendicular passage (the second liquid chamber) is high can be maintained. In particular, when the upper end surface of the porous body and the lower end surface of the first magnetic member coincide with each other, accumulation of the magnetic powder on the upper surface of the porous body can be suppressed. Accordingly, the magnetic powder can be easily assembled in the shaft-perpendicular passage, and the state in which the density of the magnetic powder in the shaft-perpendicular passage is high can be maintained.

In addition, upon electrical conduction to the coil, the magnetic powder on the upper surface of the porous body can be efficiently moved into the shaft-perpendicular passage. Accordingly, a viscosity of the mount bush can be reliably controlled according to electrical conduction to the coil.

According to the aspect of the above-mentioned (8), since the second liquid chamber has the axial passage having a constant passage width and extending in the axial direction, the orifice member can be easily disposed in the axial passage. In addition, damping characteristics of the mount bush can be easily changed by varying the passage width using the orifice member.

DETAILED DESCRIPTION OF THE INVENTION

Hereinafter, embodiments of the present invention will be described with reference to the accompanying drawings.

First Embodiment (Mount Bush)

Figure 1:
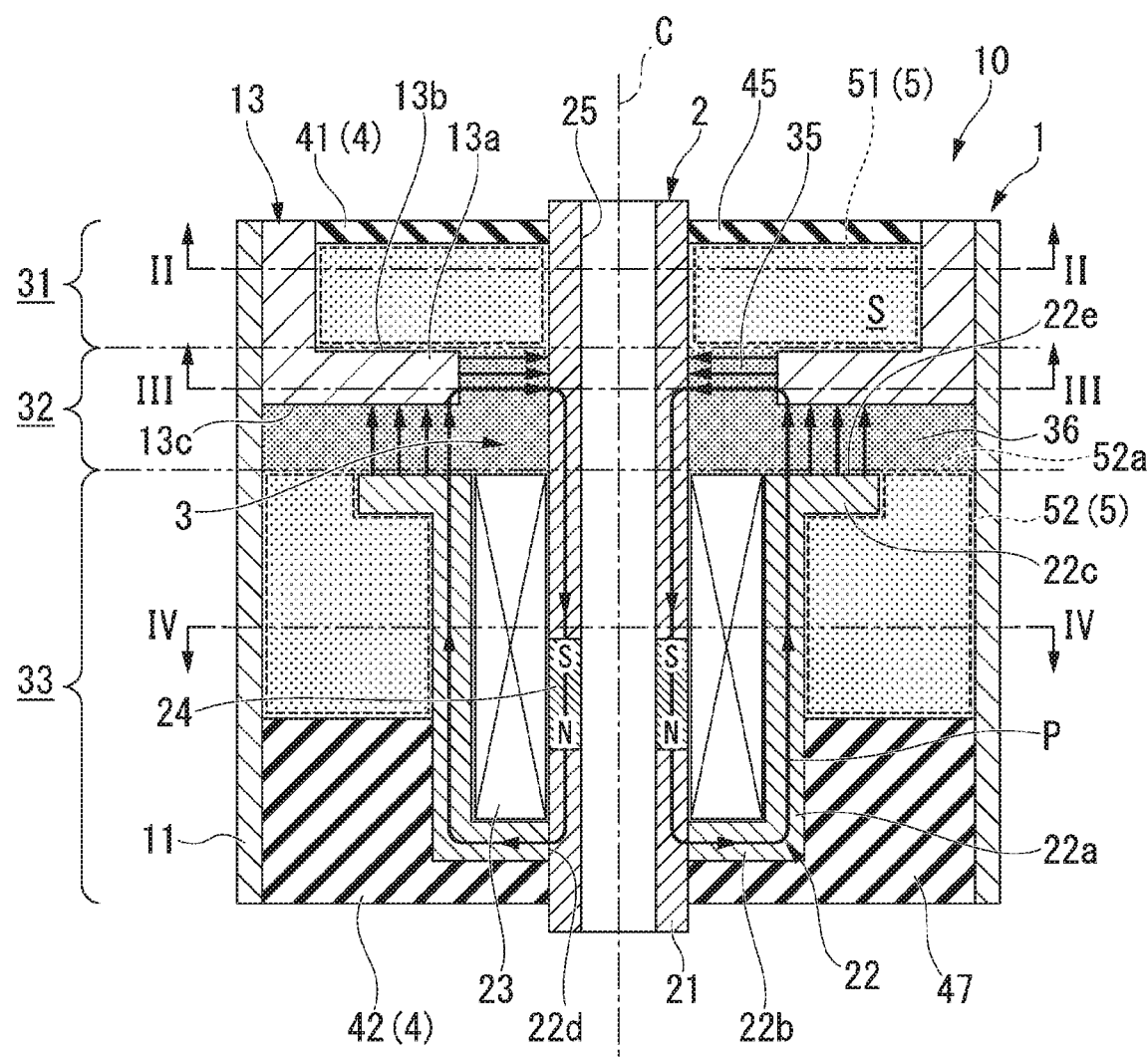
FIG. 1 is a longitudinal cross-sectional view of a mount bush according to a first embodiment.
Figure 2:
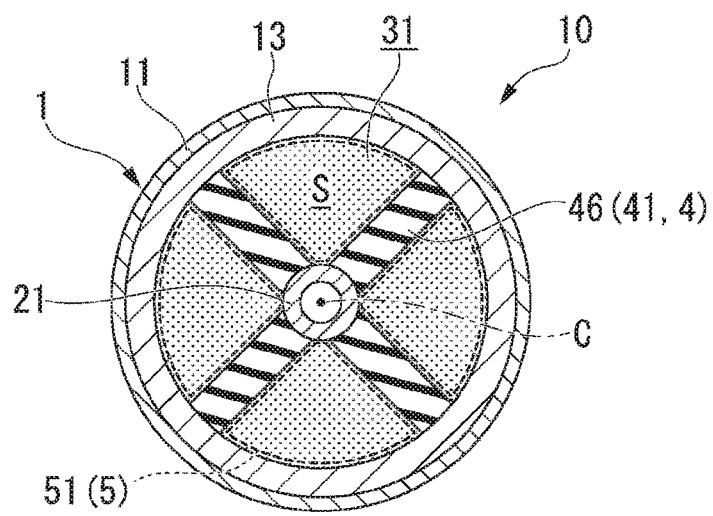
FIG. 2 is a cross-sectional view taken along line II-II in FIG. 1.
Figure 3:
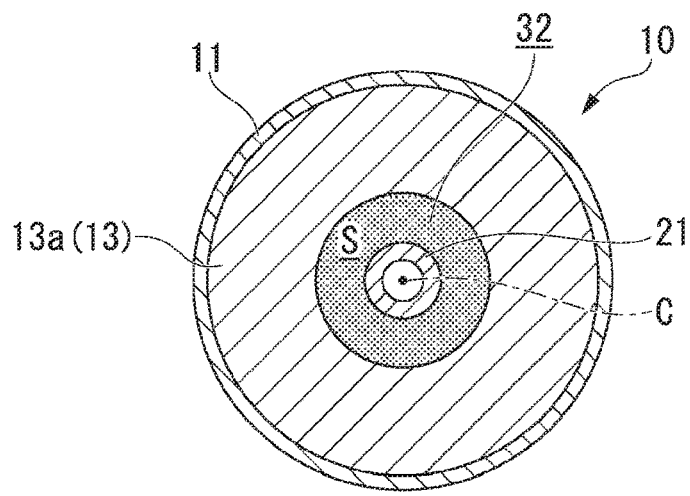
FIG. 3 is a cross-sectional view taken along line III-III in FIG. 1.
Figure 4:
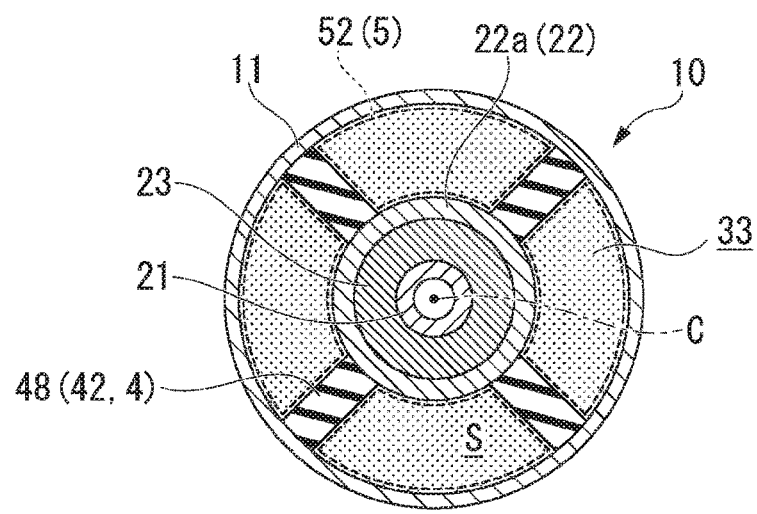
FIG. 4 is a cross-sectional view taken along line IV-IV in FIG. 1.

FIG. 1 is a longitudinal cross-sectional view of a mount bush 10 according to a first embodiment. FIGS. 2 to 4 are cross-sectional views taken along lines II-II, and IV-IV in FIG. 1.

For example, the mount bush 10 is provided between an engine (not shown) that is a power source of a vehicle and a vehicle body frame. The mount bush 10 is used as a damping apparatus configured to attenuate vibrations transmitted from an engine to a vehicle body frame.

The mount bush 10 includes a tube member 1, a shaft member 2, a magnetic viscoelastic fluid 3, an elastic member 4 and a porous body 5.

(Tube Member)

As shown in FIG. 1, the tube member 1 is formed in a tubular shape about an axis C. The tube member 1 includes an outer tube 11 having a tubular shape about the axis C, and a first magnetic member 13.

In the following description, a direction along the axis C may be referred to as an axial direction, a direction perpendicular to the axis C may be referred to as a radial direction, and a direction around the axis C may be referred to as a circumferential direction. In addition, a gravity direction coincides with the axial direction, and an upward/downward direction in FIG. 1 coincides with a gravity upward/downward direction.

The first magnetic member 13 is provided in the outer tube 11 and on an upper side in the gravity upward/downward direction.

The first magnetic member 13 is formed in a tubular shape, and has an outer circumferential surface that is fixed to an inner circumferential surface of the outer tube 11.

A first protrusion 13a is formed in the first magnetic member 13 on a lower side in the gravity upward/downward direction. The first protrusion 13a protrudes from a lower end portion of the first magnetic member 13 in the gravity upward/downward direction toward an inner side in the radial direction.

(Shaft Member)

The shaft member 2 is disposed inside the tube member 1. The shaft member 2 is movably disposed with respect to the tube member 1 in the axial direction and the radial direction. The shaft member 2 includes a shaft main body 21, a second magnetic member 22, a coil 23 and a permanent magnet 24.

The shaft main body 21 is disposed coaxially with the axis C. The shaft main body 21 is formed in a tubular shape having a vacancy 25 therein. A screw groove is formed in the vacancy 25.

The second magnetic member 22 is formed in an inverse hat shape by a cylindrical section 22a, a bottom section 22b formed at a lower side of the cylindrical section 22a in the gravity upward/downward direction, and a second protrusion 22c formed at an upper side of the cylindrical section 22a in the gravity upward/downward direction. The second magnetic member 22 is fixed to the shaft main body 21 when the shaft main body 21 is press-fitted into a bottom hole 22d formed in the bottom section 22b. The second protrusion 22c protrudes from an upper end portion of the cylindrical section 22a in the gravity upward/downward direction toward an outer side in the radial direction. The second magnetic member 22 and the first magnetic member 13 are formed to at least partially overlap each other in the axial direction.

The coil 23 is disposed between the shaft main body 21 and the cylindrical section 22a in the radial direction. The coil 23 formed as a copper wire having a predetermined wire diameter is wound around the shaft main body 21 in the circumferential direction. A lower end portion of the coil 23 in the gravity upward/downward direction comes in contact with the bottom section 22b, and an upper end portion in the gravity upward/downward direction is substantially flush with the second protrusion 22c. The coil 23 is electrically connected to an electric power supply section (not shown). The coil 23 is disposed to form a magnetic path through which a second liquid chamber 32 (to be described below) passes in the axial direction and the radial direction according to electrical conduction.

The permanent magnet 24 is formed integrally with the shaft main body 21. The permanent magnet 24 is disposed at a position overlapping the coil 23 in the axial direction and inside the coil 23 in the radial direction. The permanent magnet 24 is formed in a tubular shape coaxial with the axis C. The permanent magnet 24 is magnetized such that an upper side in the gravity upward/downward direction is an S pole, and a lower side in the gravity upward/downward direction is an N pole. A magnet magnetic path P is formed in the mount bush 10 by the permanent magnet 24. The permanent magnet 24 is disposed along a magnetic path in which a magnetizing direction is formed according to electrical conduction to the coil 23. Specifically, the magnet magnetic path P is formed such that a magnetic flux passes through the shaft main body 21, the bottom section 22b, the cylindrical section 22a, the first protrusion 13a and the shaft main body 21 in sequence.

(Magnetic Viscoelastic Fluid)

The magnetic viscoelastic fluid 3 is a mixed fluid in which a magnetic powder (not shown) is mixed with a fluid (a base liquid) such as silicon oil or the like. An internal space S between the tube member 1 and the shaft member 2 is filled with the magnetic viscoelastic fluid 3. The internal space S filled with the magnetic viscoelastic fluid 3 is divided into a first liquid chamber 31, the second liquid chamber 32 and a third liquid chamber 33.

The first liquid chamber 31 is disposed on an upper side in the gravity upward/downward direction. In the embodiment, the first liquid chamber 31 indicates a region disposed above an upper surface 13b of the first protrusion 13a in the gravity upward/downward direction.

The second liquid chamber 32 is in communication with a lower side of the first liquid chamber 31 in the gravity upward/downward direction. In the embodiment, the second liquid chamber 32 indicates a region disposed below the upper surface 13b of the first protrusion 13a in the gravity upward/downward direction and above an upper surface 22e of the second protrusion 22c in the gravity upward/downward direction.

The second liquid chamber 32 has an axial passage 35 and a shaft-perpendicular passage 36.

The axial passage 35 is in communication with the first liquid chamber 31. As shown in FIG. 1 and FIG. 3, the axial passage 35 is disposed between the first protrusion 13a of the first magnetic member 13 and the shaft main body 21, and extends in the axial direction.

The shaft-perpendicular passage 36 is in communication with the axial passage 35. The shaft-perpendicular passage 36 is disposed between the first protrusion 13a of the first magnetic member 13 and the second protrusion 22c of the second magnetic member 22, and extends in the radial direction. The shaft-perpendicular passage 36 is in communication with the third liquid chamber 33.

Magnetic paths directed along directions in which the axial passage 35 is directed in the radial direction and the shaft-perpendicular passage 36 is directed in the axial direction are formed in the second liquid chamber 32 according to electrical conduction to the coil 23.

The third liquid chamber 33 is in communication with a lower side of the second liquid chamber 32 in the gravity upward/downward direction. In the embodiment, the third liquid chamber 33 indicates a region disposed below the upper surface 22e of the second protrusion 22c in the gravity upward/downward direction.

In this way, the second liquid chamber 32 is provided between the first liquid chamber 31 and the third liquid chamber 33.

The second liquid chamber 32 brings the first liquid chamber 31 and the third liquid chamber 33 in communication with each other.

A capacity of the second liquid chamber 32 is smaller than a capacity of the first liquid chamber 31 and the third liquid chamber 33.

(Elastic Member)

The elastic member 4 is provided between the tube member 1 and the shaft member 2, and movably supports the shaft member 2 with respect to the tube member 1. The elastic member 4 includes a first elastic member 41 and a second elastic member 42.

The first elastic member 41 is provided in the first liquid chamber 31. The first elastic member 41 has a first lid section 45 and a first wall section 46.

The first lid section 45 is formed in a disk shape. The first lid section 45 is fixed to the shaft main body 21 on an inner side in the radial direction, and fixed to the first magnetic member 13 on an outer side in the radial direction. The first lid section 45 covers the internal space S from above in the gravity upward/downward direction. That is, the mount bush 10 is closed by the first lid section 45 from above in the gravity upward/downward direction.

As shown in FIG. 1 and FIG. 2, the first wall section 46 stands downward from the first lid section 45 in the gravity upward/downward direction. A plurality of (in the embodiment, four) first wall sections 46 are provided in the circumferential direction. The first wall sections 46 are formed at equal intervals in the circumferential direction. Inner end portions of the first wall sections 46 in the radial direction are fixed to the shaft main body 21, and outer end portions in the radial direction are fixed to the first magnetic member 13. The first wall sections 46 divide the first liquid chamber 31 in the circumferential direction. Further, the number of the first wall sections 46 is not limited to four. In addition, the first wall section 46 may not be provided.

The second elastic member 42 is provided in the third liquid chamber 33. The second elastic member 42 has a second lid section 47 and a second wall section 48.

The second lid section 47 is formed in a disk shape. The second lid section 47 is fixed to the shaft main body 21 and the second magnetic member 22 on an inner side in the radial direction, and fixed to the outer tube 11 on an outer side in the radial direction. A thickness of the second lid section 47 in the axial direction is larger than a thickness of the first lid section 45 in the axial direction. The second lid section 47 covers the internal space S from below in the gravity upward/downward direction. That is, the mount bush 10 is closed by the second lid section 47 from below in the gravity upward/downward direction.

As shown in FIG. 1 and FIG. 4, the second wall section 48 stands upward from the second lid section 47 in the gravity upward/downward direction. A plurality of (in the embodiment, four) second wall sections 48 are provided in the circumferential direction. The second wall sections 48 are formed at equal intervals in the circumferential direction. Inner end portions of the second wall sections 48 in the radial direction are fixed to the second magnetic member 22, and outer end portions in the radial direction are fixed to the outer tube 11. The second wall sections 48 divide the third liquid chamber 33 in the circumferential direction. Further, the number of the second wall sections 48 is not limited to four. In addition, the second wall section 48 may not be provided.

(Porous Body)

Returning to FIG. 1, the porous body 5 is disposed in the internal space S. The porous body 5 is configured such that a base liquid of the magnetic viscoelastic fluid 3 can pass therethrough and a magnetic powder cannot pass therethrough.

The porous body 5 has a first porous body 51 and a second porous body 52.

The first porous body 51 is disposed in the entire first liquid chamber 31. A plurality of (in the embodiment, four) first porous bodies 51 are disposed in the circumferential direction. The first porous bodies 51 are formed in a fan-shaped columnar form, and disposed between the first wall sections 46 that divide the first liquid chamber 31 into four parts. A base liquid of the magnetic viscoelastic fluid 3 is impregnated in a gap between the first porous bodies 51.

The second porous body 52 is disposed in the entire third liquid chamber 33. A plurality of (in the embodiment, four) second porous bodies 52 are disposed in the circumferential direction. The second porous bodies 52 are formed in a fan-shaped columnar form, and disposed between the second wall sections 48 that divide the third liquid chamber 33 in four parts. An upper end surface (an upper surface) 52a of the second porous body 52 in the gravity upward/downward direction and an upper end surface (an upper surface) 22e of the second magnetic member 22 in the gravity upward/downward direction provided in the third liquid chamber 33 are set to have the same height. A base liquid of the magnetic viscoelastic fluid 3 is impregnated in a gap between the second porous bodies 52.

In this way, the first liquid chamber 31 and the third liquid chamber 33 have the porous bodies 5. Accordingly, a magnetic powder of the magnetic viscoelastic fluid 3 is maintained in a state in which a density in the second liquid chamber 32 is high.

(Actions and Effects)

Next, actions and effects of the mount bush 10 will be described.

When a load is input to the shaft member 2, the shaft member 2 moves with respect to the tube member 1, and thus, the magnetic viscoelastic fluid 3 passes through the second liquid chamber 32 and moves between the first liquid chamber 31 and the third liquid chamber 33. Here, when a viscosity of the magnetic viscoelastic fluid 3 in the second liquid chamber 32 is varied, damping characteristics of the mount bush 10 can be controlled.

Here, when a stroke is small like in the mount bush of the engine and it is difficult to stir the magnetic viscoelastic fluid 3, a magnetic powder contained in the magnetic viscoelastic fluid 3 is precipitated, and the performance of a damping apparatus may deteriorate. For this reason, in the related art, some measures have been taken, such as inhibition of precipitation due to an increase in viscosity of the base liquid, an increase in density of the entire magnetic viscoelastic fluid 3 due to an increase in amount of a magnetic powder, or the like. However, when a viscosity of the base liquid is increased, a difference between viscosities upon electrical conduction and non-conduction to the coil 23 cannot easily occur because the original viscosity is high, and a rate of change of the viscosity may be decreased. In addition, when the amount of the magnetic powder is increased, since there is a need to provide a larger amount of magnetic powder than in a conventional case, costs may be increased.

According to the mount bush 10 of the embodiment, since the third liquid chamber 33 has the second porous body 52, the magnetic powder of the magnetic viscoelastic fluid 3, which is present in the second liquid chamber 32 and disposed above the third liquid chamber 33 in the gravity upward/downward direction, is suppressed to move to the third liquid chamber 33 due to the gravity.

Accordingly, precipitation of the magnetic powder can be suppressed, and a state in which a density of the magnetic powder in the second liquid chamber 32 is high can be maintained. In addition, since there is no need to mix a large amount of magnetic powder to maintain the state in which the density of the magnetic powder in the second liquid chamber 32 is high, the magnetic powder can be saved. In addition, since a volume of the internal space S of the mount bush 10 filled with the fluid (the base liquid) of the magnetic viscoelastic fluid 3 is reduced due to the porous body 5, the base liquid can be saved. Accordingly, the magnetic powder and the base liquid can be saved and manufacturing costs can be reduced.

In addition, the coil 23 forms a magnetic path in the second liquid chamber 32 according to electrical conduction. Since the magnetic viscoelastic fluid 3 maintained in a state in which the density of the magnetic powder is high by the porous body 5 is present in the second liquid chamber 32, the viscosity of the magnetic viscoelastic fluid 3 in the second liquid chamber 32 can be rapidly varied according to electrical conduction to the coil 23.

Accordingly, it is possible to provide a high performance mount bush 10 in which precipitation of the magnetic powder contained in the magnetic viscoelastic fluid 3 is suppressed.

In addition, since the first liquid chamber 31 disposed above the second liquid chamber 32 in the gravity upward/downward direction and the third liquid chamber 33 disposed below the second liquid chamber 32 in the gravity upward/downward direction have the porous bodies 5, respectively, movement of the magnetic powder to the first liquid chamber 31 and the third liquid chamber 33 can be suppressed. Accordingly, a state in which the density of the magnetic powder in the second liquid chamber 32 is high can be further maintained.

Accordingly, it is possible to provide a high performance mount bush 10 in which precipitation of the magnetic powder contained in the magnetic viscoelastic fluid 3 is suppressed.

In addition, in a non-conduction state in which current does not flow through the coil 23, the permanent magnet 24 forms the magnet magnetic path P in an orientation in which the axial passage 35 passes in the radial direction and in an orientation in which the shaft-perpendicular passage 36 passes in the axial direction. Accordingly, the magnetic powder can be easily assembled in the second liquid chamber 32, and precipitation of the magnetic powder can be suppressed. In addition, in the magnetic viscoelastic fluid 3 filled in the axial passage 35 and the shaft-perpendicular passage 36, since movement of the magnetic powder is restricted by the magnetic force of the permanent magnet 24, even in the non-conduction state in which current does not flow through the coil 23, a relatively higher rigidity can be secured in the mount bush 10.

According to the mount bush 10 of the embodiment, since the second liquid chamber 32 has the axial passage 35 and the shaft-perpendicular passage 36, the magnetic powder of the magnetic viscoelastic fluid 3 present in the axial passage 35 and the shaft-perpendicular passage 36 is suppressed to move to the third liquid chamber 33 due to the gravity. Accordingly, precipitation of the magnetic powder is suppressed, and a state in which the density of the magnetic powder is high in the axial passage 35 and the shaft-perpendicular passage 36 of the second liquid chamber 32 can be maintained.

In addition, the coil 23 forms magnetic paths in two directions of an orientation in which the axial passage 35 is in the radial direction and an orientation in which the shaft-perpendicular passage 36 is in the axial direction according to electrical conduction. Here, since the magnetic viscoelastic fluid 3 maintained in a state in which the density of the magnetic powder is high due to the porous body 5 is present in the axial passage 35 and the shaft-perpendicular passage 36, the viscosity of the magnetic viscoelastic fluid 3 in the axial passage 35 and the shaft-perpendicular passage 36 can be rapidly varied according to electrical conduction to the coil 23. In addition, since the magnetic paths are formed in two directions, a rate of change of the viscosity can be increased.

Accordingly, it is possible to provide a high performance mount bush 10 in which precipitation of the magnetic powder contained in the magnetic viscoelastic fluid 3 is suppressed.

In addition, since the first magnetic member 13 provided in at least one of the first liquid chamber 31 and the second liquid chamber 32 and the second magnetic member 22 provided in at least one of the second liquid chamber 32 and the third liquid chamber 33 at least partially overlap in the axial direction, the shaft-perpendicular passage 36 extending in the radial direction between the first magnetic member 13 and the second magnetic member 22 is formed in a portion in which the first magnetic member 13 and the second magnetic member 22 overlap in the axial direction. Similarly, the axial passage 35 extending in the axial direction between the first magnetic member 13 and the shaft member 2 is formed in a portion in which the first magnetic member 13 and the shaft member 2 overlap in the radial direction. In this way, the shaft-perpendicular passage 36 and the axial passage 35 extending in different directions can be formed by the first magnetic member 13 and the second magnetic member 22, respectively. Accordingly, a rate of change of the viscosity can be improved, and damping characteristics can be improved.

In addition, since the third liquid chamber 33 disposed below the shaft-perpendicular passage 36 has the second porous body 52, precipitation of the magnetic powder is suppressed, and a state in which the density of the magnetic powder in the shaft-perpendicular passage 36 and the axial passage 35 is high can be maintained.

Accordingly, it is possible to provide a high performance mount bush 10 in which precipitation of the magnetic powder contained in the magnetic viscoelastic fluid 3 is suppressed.

In the embodiment, since the upper surface 52a of the second porous body 52 provided in the third liquid chamber 33 and the upper surface 22e of the second magnetic member 22 are set to the same height, the magnetic powder can freely move in the radial direction from the upper surface 52a of the second porous body 52 to the shaft-perpendicular passage 36. Accordingly, precipitation of the magnetic powder is suppressed, and a state in which the density of the magnetic powder in the shaft-perpendicular passage 36 (the second liquid chamber 32) is high can be maintained.

In addition, upon electrical conduction to the coil 23, the magnetic powder of the upper surface 52a of the second porous body 52 can be efficiently moved in the shaft-perpendicular passage. Accordingly, a viscosity of the mount bush 10 can be reliably controlled according to electrical conduction to the coil 23.

Next, a first variant and a second variant in the embodiment will be described with reference to FIG. 5 and FIG. 6. Further, the same or similar members in the first variant and the second variant as those of the above-mentioned embodiment are designated by the same reference numerals, and detailed description thereof will be omitted. In the following description, reference numerals related to the components other than those disclosed in FIG. 5 and FIG. 6 appropriately refer to FIG. 1 to FIG. 4.

(First Variant)

Figure 5:
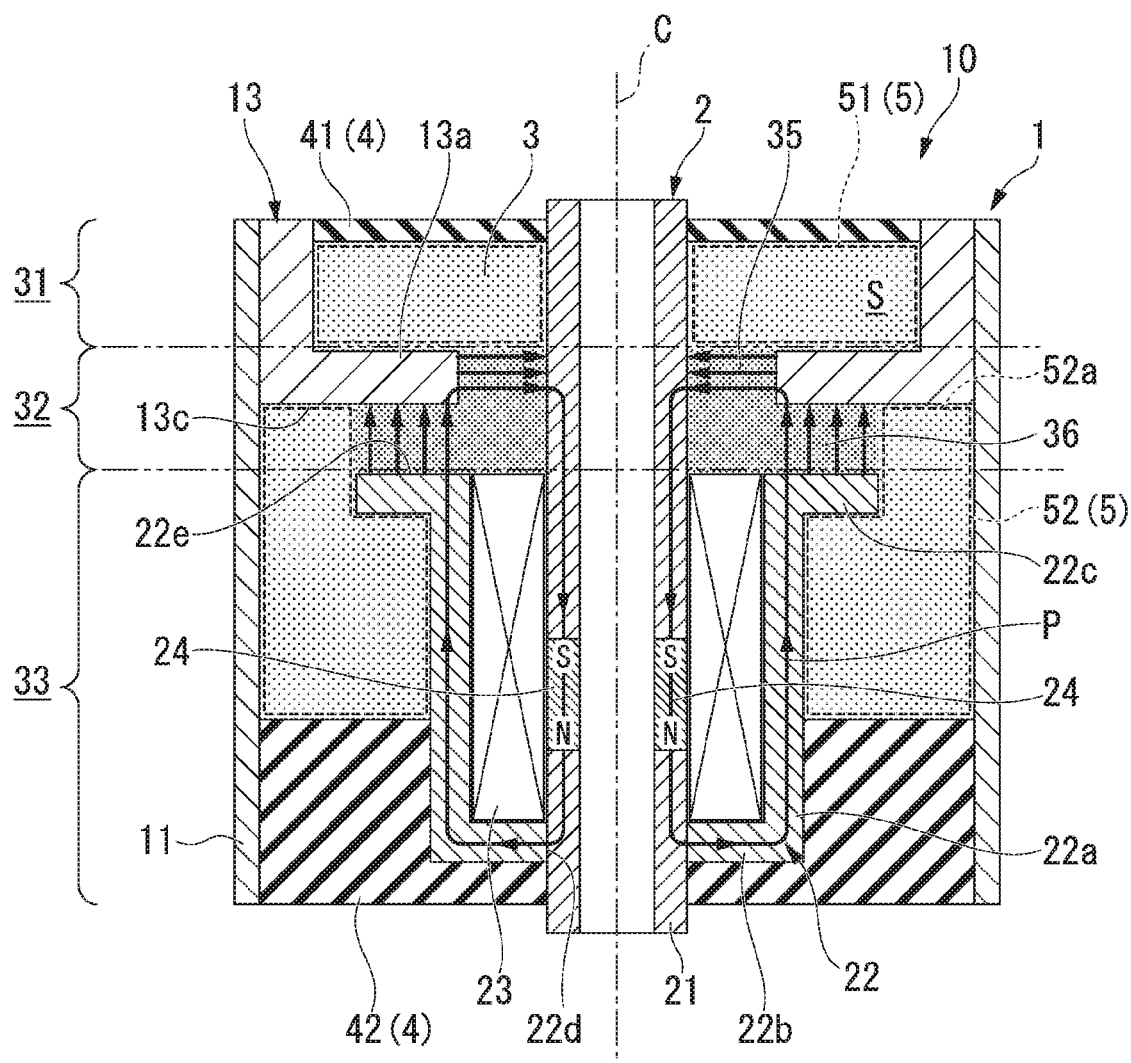
FIG. 5 is a longitudinal cross-sectional view of a mount bush according to a first variant of the first embodiment.

FIG. 5 is a longitudinal cross-sectional view of the mount bush 10 according to a first variant. The embodiment is distinguished from the above-mentioned embodiment in that a height of the upper surface 52a of the second porous body 52 coincides with a lower surface 13c of the first magnetic member 13.

In the embodiment, a height of the upper end surface (the upper surface) 52a in the gravity upward/downward direction of the second porous body 52 provided in the third liquid chamber 33 is set to be the same height as of the lower end surface (the lower surface) 13c in the gravity upward/downward direction of the first magnetic member 13.

According to the first variant, accumulation of the magnetic powder on the upper surface 52a of the second porous body 52 can be suppressed. Accordingly, the magnetic powder is easily assembled in the shaft-perpendicular passage 36, and a state in which the density of the magnetic powder in the shaft-perpendicular passage 36 is high can be maintained.

In addition, upon electrical conduction to the coil 23, the magnetic powder on the upper surface 52a of the second porous body 52 can be efficiently moved into the shaft-perpendicular passage 36. Accordingly, a viscosity of the mount bush 10 can be reliably controlled according to electrical conduction to the coil 23.

Further, a height of the upper surface 52a of the second porous body 52 may be set to a position above the upper surface 22e of the second magnetic member 22 and below the lower surface 13c of the first magnetic member 13.

In this case, the magnetic powder can be moved in the radial direction from the upper surface 52a of the second porous body 52 toward the shaft-perpendicular passage 36. Accordingly, precipitation of the magnetic powder is suppressed, and a state in which the density of the magnetic powder in the shaft-perpendicular passage 36 is high can be maintained.

(Second Variant)

Figure 6:
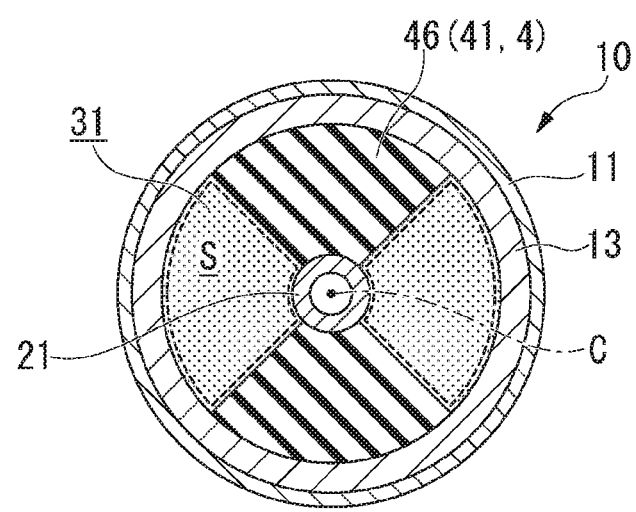
FIG. 6 is a cross-sectional view according to a second variant of the first embodiment taken along line II-II in FIG. 1.

FIG. 6 is a cross-sectional view taken along line II-II in FIG. 1 according to a second variant. The embodiment is distinguished from the above-mentioned embodiment in that the wall sections 46 and 48 of the elastic member 4 are formed in a fan shape when seen in the axial direction.

In the embodiment, as shown in FIG. 6, the first wall section 46 of the first elastic member 41 is formed in a fan shape when seen in the axial direction. The first wall section 46 has an outer circumferential surface that is connected to the first magnetic member 13 and an inner circumferential surface that is connected to the shaft main body 21. Similarly, while not shown, the second wall section 48 of the second elastic member 42 is formed in a fan shape when seen in the axial direction. The second wall section 48 has an outer circumferential surface that is connected to the outer tube 11 and an inner circumferential surface that is connected to the shaft main body 21 and the second magnetic member 22.

According to the embodiment, in comparison with the case in which the elastic member 4 having a flat plate shape is used, high rigidity of the elastic member 4 is secured. Accordingly, movement of the magnetic viscoelastic fluid 3 in the circumferential direction can be suppressed.

Accordingly, a flow of the magnetic viscoelastic fluid 3 in the circumferential direction can be prevented, and a magnitude of the viscosity of the magnetic viscoelastic fluid 3 can be accurately controlled. In addition, the fluid can also be appropriately used in the mount bush 10 in which the high rigidity is required.

Next, a second embodiment and a third embodiment will be described with reference to FIG. 7 to FIG. 9. Further, the same or similar members of the second embodiment and the third embodiment as those in the first embodiment are designated by the same reference numerals, and detailed description thereof will be omitted. In the following description, reference numerals related to the components other than those disclosed in FIG. 7 to FIG. 9 appropriately refer to FIG. 1 to FIG. 4.

Second Embodiment

Figure 7:
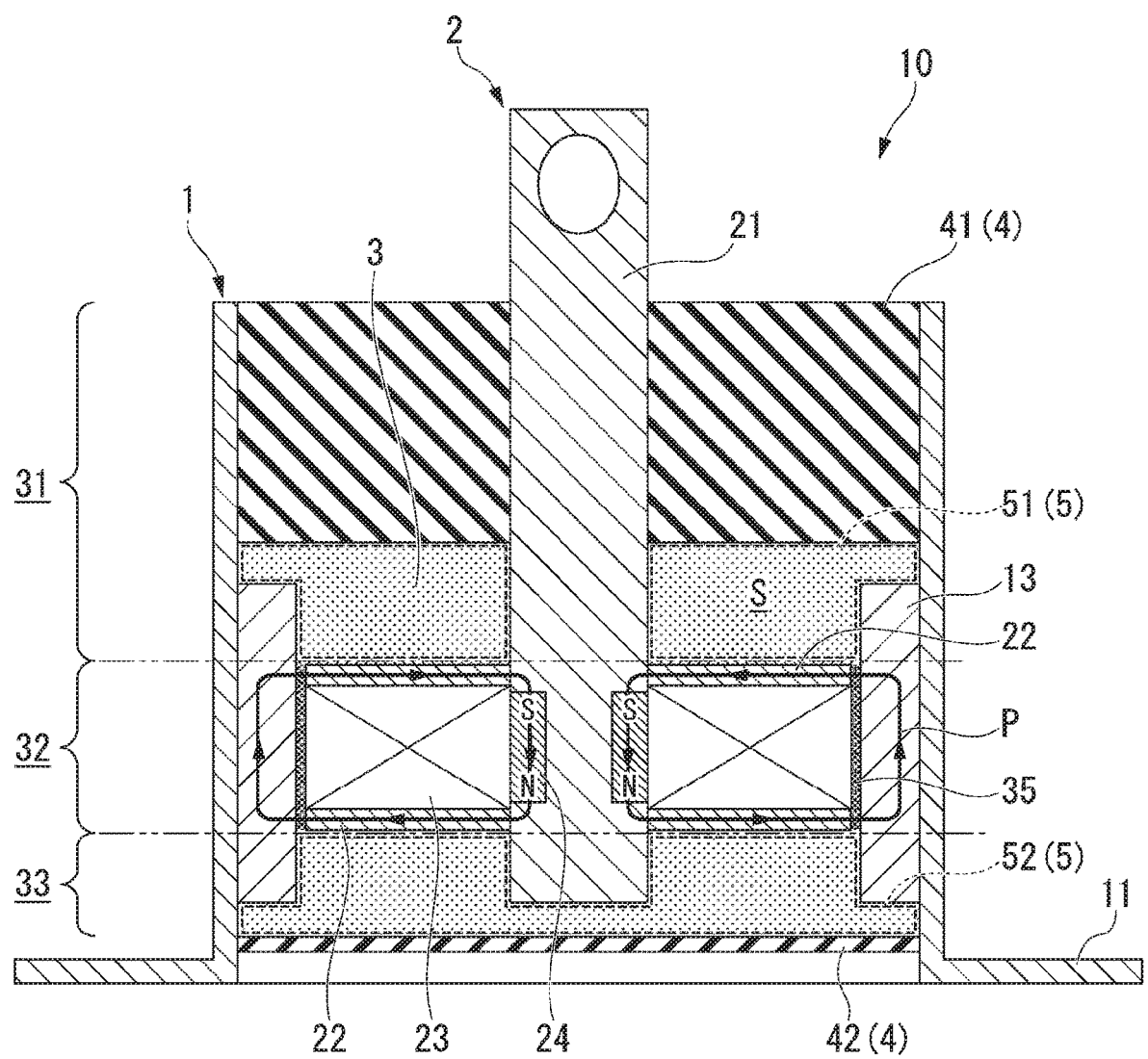
FIG. 7 is a longitudinal cross-sectional view of a mount bush according to a second embodiment.

FIG. 7 is a longitudinal cross-sectional view of a mount bush 10 according to the second embodiment. The embodiment is distinguished from the above-mentioned embodiment in that a second liquid chamber 32 has only an axial passage 35.

In the embodiment, a shaft member 2 has a shaft main body 21, two second magnetic members 22 formed in a disk shape and arranged in the axial direction, a coil 23 disposed between the two second magnetic members 22, and a permanent magnet 24 disposed inside the coil 23 in the radial direction. In addition, the first magnetic member 13 is formed in a tubular shape. The axial passage 35 is provided between the outer circumferential surfaces of the second magnetic member 22 and the coil 23 and the inner circumferential surface of the first magnetic member 13. In other words, the first magnetic member 13 and the second magnetic member 22 at least partially overlap in the radial direction, and the axial passage 35 is formed between the overlapping portions.

The first liquid chamber 31 disposed above the axial passage 35 in the gravity upward/downward direction has a first porous body 51. The third liquid chamber 33 disposed below the axial passage 35 in the gravity upward/downward direction has a second porous body 52.

According to the embodiment, the axial passage 35 extending in the axial direction can be formed between the first magnetic member 13 and the second magnetic member 22 in the portion in which the first magnetic member 13 and the second magnetic member 22 overlap in the radial direction. In addition, a flow path width of the axial passage 35 can be varied and set to a predetermined viscosity by varying dimensions of the first magnetic member 13 and the second magnetic member 22.

In addition, since the first liquid chamber 31 and the third liquid chamber 33 have the porous bodies 5, precipitation of the magnetic powder is suppressed, and a state in which the density of the magnetic powder in the axial passage 35 is high can be maintained. Accordingly, it is possible to provide a high performance mount bush 10 in which precipitation of the magnetic powder contained in the magnetic viscoelastic fluid 3 is suppressed.

In addition, according to the embodiment, in addition to exhibition of the same actions and effects as those of the first embodiment, since the second liquid chamber 32 has only the axial passage 35, the embodiment can also be applied to the case in which a stroke in the axial direction of the shaft member 2 with respect to the tube member 1 is large.

Third Embodiment

Figure 8:
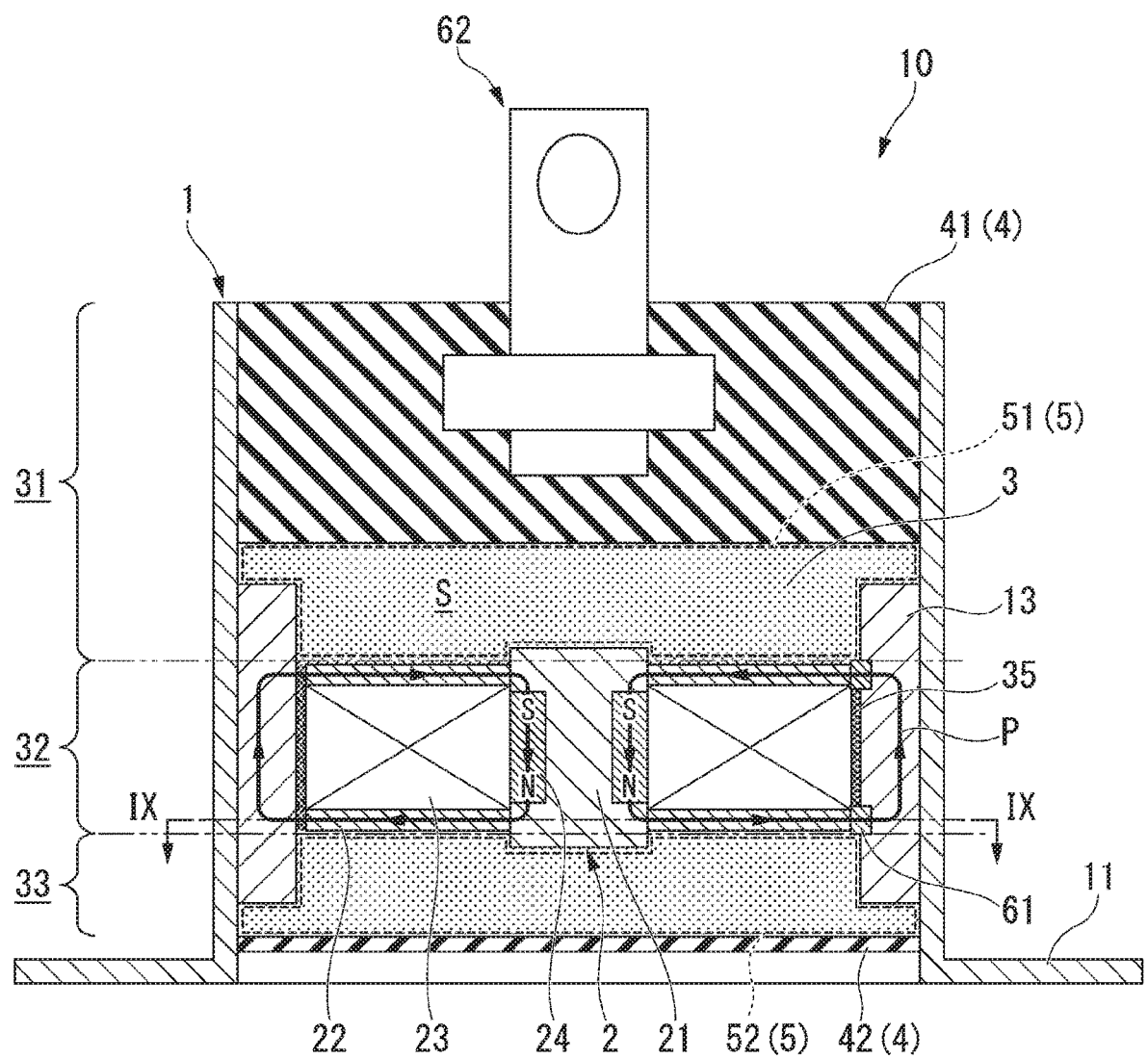
FIG. 8 is a longitudinal cross-sectional view of a mount bush according to a third embodiment.

FIG. 8 is a longitudinal cross-sectional view of a mount bush 10 according to a third embodiment. FIG. 9 is a cross-sectional view taken along line IX-IX in FIG. 8. The embodiment is distinguished from the above-mentioned embodiment in that the shaft member 2 and the tube member 1 are joined to each other and the second liquid chamber 32 has an orifice 64.

In the embodiment, the first magnetic member 13 and the second magnetic member 22 are joined by a joining member 61. A plurality of (in the embodiment, three) joining members 61 are provided in the circumferential direction. A plurality of (in the embodiment, two) joining members 61 are provided in the axial direction. The first elastic member 41 has a shaft 62. The shaft 62 is configured to be movable with respect to the tube member 1 by an elastic force of the first elastic member 41.

Figure 9:
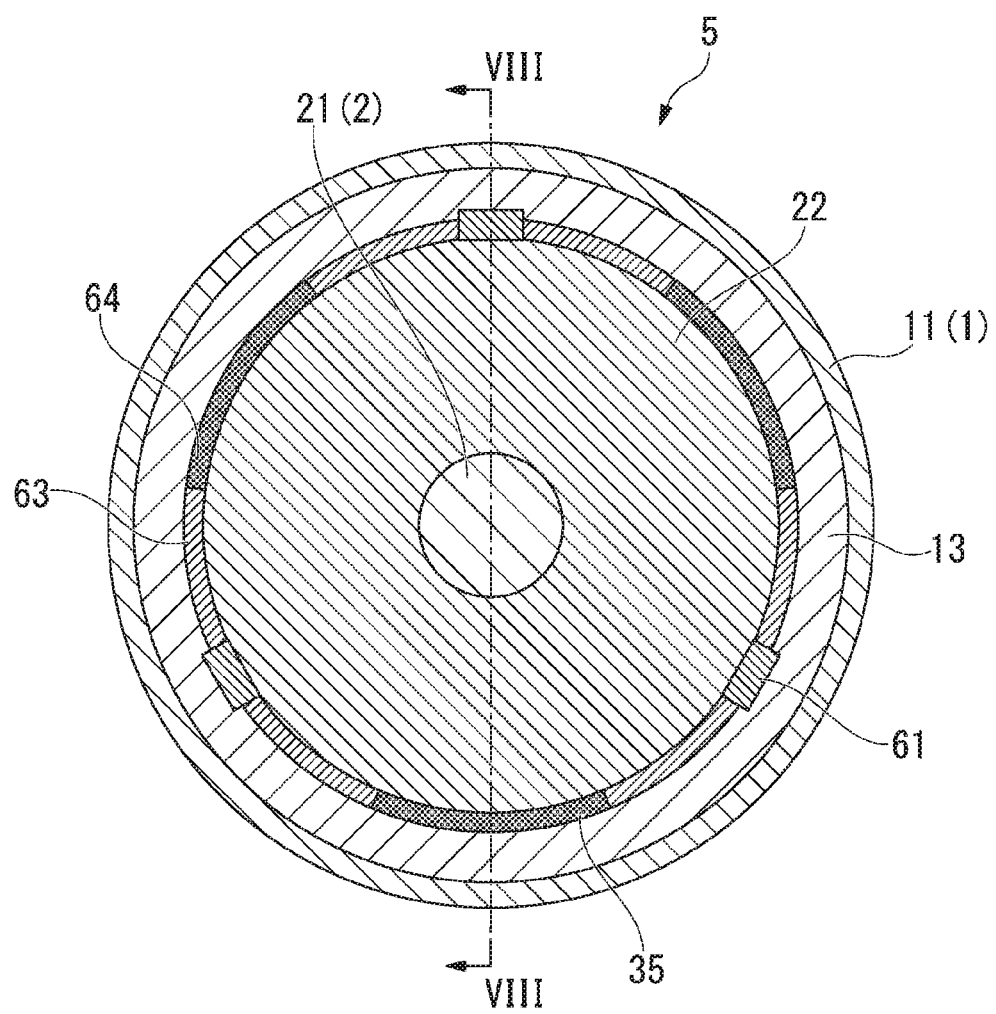
FIG. 9 is a cross-sectional view taken along line IX-IX in FIG. 8.

In addition, as shown in FIG. 9, an orifice member 63 is disposed between the joining members 61 in the radial direction. A plurality of orifice members 63 are disposed in the circumferential direction. The orifice members 63 extend in the axial passage 35 in the axial direction. The axial passage 35 is divided by the orifice member 63 in the circumferential direction. The orifice member 63 is fixed to the second magnetic member 22 and the first magnetic member 13. A gap between the orifice members 63 is the orifice 64.

According to the embodiment, when the shaft 62 is displaced and the first elastic member 41 is deformed, the magnetic viscoelastic fluid 3 passes through the axial passage 35 and moves between the first liquid chamber 31 and the third liquid chamber 33. Accordingly, in addition to exhibition of the same actions and effects as those of the above-mentioned second embodiment, versatility can be improved when the shaft 62 is provided as a separate body.

In addition, since the second liquid chamber 32 has the axial passage 35 having a constant passage width and extending in the axial direction, the orifice member 63 can be easily disposed in the axial passage 35. When the passage width of the axial passage 35 is varied by the orifice member 63, the orifice 64 having an arbitrary size can be formed. Accordingly, damping characteristics of the mount bush 10 can be easily changed.

Further, the orifice member 63 may not be provided.

The technical scope of the present invention is not limited to the above-mentioned embodiments and various modifications may be made without departing from the scope of the present invention.

For example, while the tube member 1 having a tubular shape has been described in the above-mentioned embodiments, an external form of the tube member 1 when seen in the axial direction may have a rectangular shape or a polygonal shape.

In addition, the porous body 5 may be provided in the third liquid chamber 33 disposed below at least the second liquid chamber 32 in the gravity upward/downward direction. However, in addition to provision of the second porous body 52 in the third liquid chamber 33, the first porous body 51 may be further provided in the first liquid chamber 31. In this case, it is advantageous that the second liquid chamber 32 can be further maintained in a state in which the density of the magnetic powder is high.

In addition, oil or liquid that is separate from the base liquid of the magnetic viscoelastic fluid 3 may be impregnated in the porous body 5.

In the embodiment, while the example in which a load is input to the shaft member 2 has been described, a configuration in which a load is input to the tube member 1 and the shaft member 2 is fixed to the vehicle body frame may be provided.

In addition, disposition of the permanent magnet 24 is not limited to the above-mentioned embodiments. The permanent magnet 24 may be provided at a place of any one of the tube member 1 and the shaft member 2 as long as the magnet magnetic path P along the coil magnetic path generated by the coil 23 can be formed. In addition, the magnetizing direction of the permanent magnet may be reversed.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A mount bush comprising:
a tube member;
a shaft member disposed inside the tube member coaxially with an axis of the tube member and having a coil;
a first liquid chamber disposed at an upper side in an internal space between the tube member and the shaft member in a gravity upward/downward direction;
a second liquid chamber in communication with a lower side of the first liquid chamber in the gravity upward/downward direction and containing a magnetic viscoelastic fluid; and
a third liquid chamber in communication with a lower side of the second liquid chamber in the gravity upward/downward direction and having a porous body,
wherein the coil is disposed such that a magnetic path that passes through the second liquid chamber in an orientation along at least one of an axial direction along the axis and a radial direction perpendicular to the axial direction is formed through electrical conduction,
wherein the second liquid chamber includes:
an axial passage that communicates with the first liquid chamber and that extends in the axial direction; and
a shaft-perpendicular passage that communicates with the axial passage and the third liquid chamber and that extends in the radial direction, and
wherein the coil is disposed such that a magnetic path, which passes through the axial passage in an orientation along the radial direction and passes through the shaft-perpendicular passage in an orientation along the axial direction, is formed through the electrical conduction.

2. The mount bush according to claim 1, wherein the first liquid chamber has another porous body.

3. The mount bush according to claim 1, wherein at least one of the first liquid chamber and the second liquid chamber has a first magnetic member fixed to the tube member,
at least one of the second liquid chamber and the third liquid chamber has a second magnetic member fixed to the shaft member, and
the first magnetic member and the second magnetic member at least partially overlap in the radial direction.

4. The mount bush according to claim 1, wherein at least one of the first liquid chamber and the second liquid chamber has a first magnetic member fixed to the tube member,
at least one of the second liquid chamber and the third liquid chamber has a second magnetic member fixed to the shaft member, and
the first magnetic member and the second magnetic member at least partially overlap in the axial direction.

5. The mount bush according to claim 4, wherein an upper end surface in the gravity upward/downward direction of the porous body provided in the third liquid chamber and an upper end surface in the gravity upward/downward direction of the second magnetic member are set to have the same height.

6. The mount bush according to claim 4, wherein a height of an upper end surface in the gravity upward/downward direction of the porous body provided in the third liquid chamber is set to be above an upper end surface in the gravity upward/downward direction of the second magnetic member and to be level with or lower than a lower end surface in the gravity upward/downward direction of the first magnetic member.

7. The mount bush according to claim 1, wherein an orifice member is disposed in at least one of a space between the first liquid chamber and the second liquid chamber and a space between the second liquid chamber and the third liquid chamber.

* * * * *